US011850883B2

(12) United States Patent
Meggiolan et al.

(10) Patent No.: US 11,850,883 B2
(45) Date of Patent: Dec. 26, 2023

(54) PROCESS FOR MANUFACTURING A SPOKED BICYCLE WHEEL AND RELATED WHEEL

(71) Applicant: CAMPAGNOLO S.r.l., Vicenza (IT)

(72) Inventors: Mario Meggiolan, Creazzo (IT); Filippo Bove, Padua (IT)

(73) Assignee: CAMPAGNOLO S.r.l., Vicenza (IT)

( * ) Notice: Subject to any disclaimer, the term of this patent is extended or adjusted under 35 U.S.C. 154(b) by 196 days.

(21) Appl. No.: 17/380,594

(22) Filed: Jul. 20, 2021

(65) Prior Publication Data

US 2022/0032684 A1 Feb. 3, 2022

(30) Foreign Application Priority Data

Jul. 28, 2020 (IT) .................. 102020000018223

(51) Int. Cl.
*B60B 21/06* (2006.01)
*B60B 1/04* (2006.01)
*B60B 31/00* (2006.01)

(52) U.S. Cl.
CPC ............ *B60B 21/062* (2013.01); *B60B 1/045* (2013.01); *B60B 31/005* (2013.01); *Y10T 29/49512* (2015.01)

(58) Field of Classification Search
CPC ... B60B 21/041; B60B 21/043; B60B 21/044; B60B 21/045; B60B 21/062; B60B 31/005; Y10T 29/49512
See application file for complete search history.

(56) References Cited

U.S. PATENT DOCUMENTS

| 546,320 A | 9/1895 | Goodrich |
| 4,410,842 A | 10/1983 | Owen |

(Continued)

FOREIGN PATENT DOCUMENTS

| CH | 355 041 A | 6/1961 |
| CN | 101332742 A | * 12/2008 |

(Continued)

OTHER PUBLICATIONS

Italian Search Report and Written Opinion in Italian Application No. 102020000018217, dated Apr. 15, 2021 with English translation.

(Continued)

*Primary Examiner* — Kip T Kotter
(74) *Attorney, Agent, or Firm* — Steinfl + Bruno LLP

(57) ABSTRACT

A process for manufacturing a spoked bicycle wheel, comprising the steps of providing a rim element having a spoke attachment chamber; providing a spoke attachment assembly for coupling to a respective spoke, inserting the spoke attachment assembly through an opening of the spoke attachment chamber along an insertion direction that is inclined with respect to the rim element and moving the spoke attachment assembly along the insertion direction until a stem of the spoke attachment assembly is at the surface of the spoke attachment chamber; moving the spoke attachment assembly along the surface of the spoke attachment chamber towards a spoke attachment seats; inserting the stem in the spoke attachment seat; and, constraining the spoke attachment assembly in the spoke attachment seat. The steps are repeated to couple a respective spoke attachment assembly to each of the plurality of spoke attachment seats. The invention also relates to a spoked bicycle wheel produced by the above process.

7 Claims, 5 Drawing Sheets

(56) References Cited

U.S. PATENT DOCUMENTS

| | | |
|---|---|---|
| 8,025,344 B1 | 9/2011 | Wang |
| 2004/0100142 A1 | 5/2004 | Meggiolan et al. |
| 2004/0139609 A1* | 7/2004 | Meggiolan ............ B60B 21/062 29/894.3 |
| 2004/0165938 A1 | 8/2004 | Chen |
| 2005/0161997 A1 | 7/2005 | Passarotto et al. |
| 2007/0158996 A1 | 7/2007 | Meggiolan et al. |
| 2009/0014129 A1 | 1/2009 | Hsu |
| 2012/0212038 A1 | 8/2012 | Watarai |
| 2014/0239703 A1 | 8/2014 | Walthert et al. |
| 2019/0168536 A1* | 6/2019 | Meggiolan .............. B60B 1/041 |
| 2022/0032680 A1 | 2/2022 | Meggiolan et al. |

FOREIGN PATENT DOCUMENTS

| | | |
|---|---|---|
| DE | 10 2008 048453 A1 | 10/2009 |
| DE | 10 2009 052027 A1 | 5/2011 |
| DE | 102016005990 A1 * | 11/2017 |
| EP | 1386756 A2 | 2/2004 |
| EP | 1 422 078 A1 | 5/2004 |
| EP | 1 559 582 A1 | 8/2005 |
| EP | 2 492 113 A1 | 8/2012 |
| EP | 2487047 A1 | 8/2012 |
| EP | 2 769 851 A1 | 8/2014 |
| EP | 3 495 161 A1 | 6/2019 |
| EP | 3495161 A1 | 6/2019 |
| FR | 2513185 A1 | 3/1983 |
| FR | 2813558 A1 | 3/2002 |
| JP | S57 91603 U | 6/1982 |

OTHER PUBLICATIONS

Italian Search Report and Written Opinion in Italian Application No. 102020000018223, dated Apr. 15, 2021 with English translation.
Final Office Action for U.S. Appl. No. 17/380,571, filed Jul. 20, 2021 on behalf of Campagnolo S.R.L. dated Jun. 29, 2023 12 pages.
Non-Final Office Action for U.S. Appl. No. 17/380,571, filed Jul. 20, 2021 on behalf of Campagnolo S.R.L. dated Mar. 24, 2023 16 pages.

* cited by examiner

PROCESS FOR MANUFACTURING A SPOKED BICYCLE WHEEL AND RELATED WHEEL

CROSS REFERENCE TO RELATED APPLICATION

This application claims the benefit of Italian Application No. 102020000018223, filed on Jul. 28, 2020, which is incorporated herein by reference as if fully set forth.

FIELD OF INVENTION

The present invention relates to a process for manufacturing a spoked bicycle wheel, as well as a spoked bicycle wheel obtained by carrying out the aforementioned process

BACKGROUND

The aforementioned wheel can be a front wheel or a rear wheel of the bicycle. Such a bicycle can be a mountain-bike or a leisure bicycle or a racing bicycle.

A spoked bicycle wheel comprises a rim, a hub and a plurality of spokes extending between the hub and the rim.

It is known to couple the rim to a plurality of nipples, one for each spoke, and coupling each spoke to the rim through a respective nipple.

The nipple can be configured to allow the adjustment of the tension of the spoke at the rim. Differently, the nipple can simply allow the coupling of the spoke to the rim. In this second case, the adjustment of the tension of the spoke can take place at the hub.

The nipple comprises an enlarged head configured to abut with the rim upon tensioning the spoke and a stem provided with a coupling portion configured to be coupled to the spoke.

In the cases in which the nipple is configured to allow the adjustment of the tension of the spoke, the coupling portion comprises a threaded hole which opens at a free end of the stem.

The spoke comprises an end portion configured to be coupled to the hub in a conventional manner and an opposite end portion configured to be coupled to the rim.

In the cases in which the nipple is configured to allow the adjustment of the tension of the spoke, the aforementioned opposite end portion of the spoke has an outer threading configured to be screwed to the threaded hole of the respective nipple. The length of the aforementioned outer threading can be equal to that of the threaded hole of the nipple, but typically it is greater than that of the threaded hole of the nipple, so that tensioning of the spoke may be adjusted by screwing or unscrewing the spoke into or from the nipple. Such screwing/unscrewing is obtained by rotating the nipple. Due to such a screwing/unscrewing the screwing depth of the spoke in the threaded hole of the nipple changes and, consequently, the total longitudinal extension of the assembly formed by spoke and nipple increases or decreases.

Rims having a radially outer tyre coupling channel and a radially inner spoke attachment chamber are known. Such a type of rim is shown for example in US 2007/0158996 A1, to the same Applicant.

Typically, the rims are made of aluminium or alloys thereof (in which case they can be obtained by extrusion of a profiled bar) or of a composite material (in which case they can be obtained by injection or compression molding).

The spoke attachment chamber comprises a lower bridge in which a plurality of spoke-attachment through holes are made, each configured to house a respective nipple, and in which a through hole is also made for the passage of the inflation valve of the air chamber of the tyre of the wheel or, in the case of tubeless tyres, of the tyre itself.

The spoke attachment chamber further comprises an upper bridge in which a through hole for the passage of the aforementioned inflation valve is made. In many solutions, further through holes are formed on the upper bridge, one at each spoke-attachment through hole, in order to allow the insertion of the nipples in the respective spoke-attachment through holes.

The stem of each nipple is inserted into the respective spoke-attachment through hole from a radially outer side with respect to the lower bridge of the rim, whereas the enlarged head of the nipple remains in a radially outer position with respect to the lower bridge and, after the spoke has been coupled to the nipple (typically screwed onto the threaded hole of the nipple) and tensioned, in abutment on the lower bridge.

In the case of rims made of aluminium (or alloys thereof), the enlarged head of the nipple is typically in abutment on a suitable abutment seat made in a recess formed, typically by mechanical chip removal, in the lower bridge of the rim at least at each spoke-attachment through hole.

In the case of rims made of a composite material, since it is not easy to make the aforementioned recess due to the difficulty in machining the composite material, the enlarged head of the nipple is typically in abutment on a perforated insert specifically arranged on the lower bridge of the rim at each of the spoke-attachment through holes. The perforated inserts are typically co-molded with the rim, as described for example in EP 3495161 A1, to the same Applicant, and can for example be made of polyetherimide, commercialized with the trade name Ultem 2400 by Sabic, Riyadh.

A drawback of this last solution is the cost of the perforated inserts, due to the particular material used.

Again in the case of rims made of a composite material, in order to make a more cost-effective solution, it is known to use, instead of the aforementioned perforated inserts, a plurality of shaped washers made of steel, each shaped washer being arranged at each spoke-attachment through hole. In this case, the lower bridge has a substantially flat circumferential surface on which the aforementioned shaped washers rest. The upper bridge, on the other hand, has a plurality of service holes, one at each spoke-attachment through hole, in order to allow the insertion of the shaped washers and of the respective nipples in the spoke attachment chamber and their positioning at the respective spoke-attachment through holes, through for example suitable elongated tools.

A drawback of this solution is correlated to the need to apply a band onto the upper bridge to seal the aforementioned service holes, so as both not to risk damaging or perforating the air chamber of the tyre and to allow the airtight seal in the case of use of rims configured to be used with tubeless tyres.

A solution that overcomes the problem of providing a plurality of service holes on the upper bridge of the rim is described in US 2007/0158996 A1, to the same Applicant. Such a document discloses a rim in which the upper bridge has only one through hole for the inflation valve of the tyre, or a limited number of service holes. In such a document a process is also described that is aimed at manufacturing a spoked bicycle wheel. Such a process comprises the step of inserting the nipple into the spoke attachment chamber through an opening (which can be the through hole for the tyre inflation valve or a different opening made on purpose) and guiding the nipple along the spoke attachment chamber towards and up to a respective spoke attachment seat. The process further comprises the step of inserting the stem of the nipple into the spoke attachment seat until the head of the nipple is brought in abutment on the lower bridge of the rim.

The nipples described in US 2007/0158996 A1 are made of aluminium and, during the aforementioned process, are coupled to respective inserts made of a ferromagnetic material. Each ferromagnetic insert has a head and a threaded stem that is screwed into a threaded hole of the nipple. In this way, the assembly of nipple and ferromagnetic insert, once inserted into the spoke attachment chamber, is guided and moved along the spoke attachment chamber due to the magnetic attraction exerted for example by a small magnet that is moved by hand or automatically, along and outside of the rim, until the predetermined spoke attachment seat is reached. Once such a spoke attachment seat is reached, the stem of the nipple is extracted from the spoke attachment seat thanks to the magnetic coupling between one end of the magnet and the head of the ferromagnetic insert. Thereafter, the magnet is detached from the ferromagnetic insert, the latter is unscrewed from the threaded hole of the nipple and a threaded end portion of the spoke is screwed onto the nipple.

The aforementioned process can be used for rims made of steel, aluminium (or alloys thereof), magnesium (or alloys thereof) or of a composite material.

The Applicant has concentrated its attention on rims of the type described in US 2007/0158996 A1, or on rims that do not require making on the upper bridge a service hole at each spoke attachment seat and consequently applying on the upper bridge a band in order to allow the use of the rim with tubeless tyres or to avoid damaging the air chamber of the tyre.

The Applicant has observed that the process described in US 2007/0158996 A1 cannot be applied as such in those cases in which, in order to maintain the cost-effectiveness of the rim, the shaped washers discussed above are used. Indeed, there would be the risk that such shaped washers, once inserted in the spoke attachment chamber, can be dispersed inside such a chamber or, in the case in which they are inserted already applied onto the stem of the nipple, can slip off from the nipple, with consequent complications in the assembly and/or manufacturing operations of the wheel.

The technical problem at the basis of the present invention is to provide a system that allows an easy positioning of the nipples and of the respective shaped washers at the spoke attachment seats of the lower bridge of the rim in those cases in which the upper bridge of the rim does not have a service hole at each spoke attachment seat.

SUMMARY

The present invention relates, in a first aspect thereof, to a process for manufacturing a spoked bicycle wheel, comprising the steps of:

a) providing a rim element having a tyre coupling channel and at least one spoke attachment chamber provided with at least one opening and with a spoke attachment surface comprising a plurality of spoke attachment seats;

b) providing a spoke attachment assembly comprising:

a nipple having an enlarged head and a stem provided with a coupling portion configured to be coupled to a respective spoke;

at least one shaped washer applied onto the stem of the nipple;

c) inserting the spoke attachment assembly in the at least one spoke attachment chamber through said at least one opening along an insertion direction that is inclined with respect to a horizontal plane arranged below the rim element and according to a sense of insertion that is oriented away from the horizontal plane;

d) moving the spoke attachment assembly along the insertion direction until the stem of the nipple is brought at the spoke attachment surface;

e) moving said spoke attachment assembly along the spoke attachment surface towards and up to one of said spoke attachment seats;

f) inserting the stem of the nipple of said spoke attachment assembly in said spoke attachment seat;

g) constraining said spoke attachment assembly to said spoke attachment seat;

h) repeating steps c) to g) in order to couple a respective spoke attachment assembly to each of the plurality of spoke attachment seats.

In a second aspect thereof, the invention relates to a process aimed at manufacturing a spoked bicycle wheel, comprising the steps of:

a1) providing a rim element having a tyre coupling channel and at least one spoke attachment chamber provided with at least one opening and with a spoke attachment surface comprising a plurality of spoke attachment seats;

b1) providing a spoke attachment assembly comprising:

a nipple having an enlarged head and a stem provided with a coupling portion configured to be coupled to a respective spoke;

at least one shaped washer applied onto the stem of the nipple;

c1) arranging the spoke attachment assembly in an operative position in which the enlarged head of the nipple is positioned so as to keep the at least one shaped washer applied onto the stem of the nipple;

d1) inserting the spoke attachment assembly in the at least one spoke attachment chamber through said at least one opening and along an insertion direction, keeping the spoke attachment assembly in said operative position;

e1) moving the spoke attachment assembly along the insertion direction until the stem of the nipple is brought at the spoke attachment surface;

f1) moving the spoke attachment assembly along the spoke attachment surface towards and up to one of said spoke attachment seats;

g1) inserting the stem of the nipple of said spoke attachment assembly in said spoke attachment seat;

h1) constraining said spoke attachment assembly to said spoke attachment seat;

i1) repeating steps b1) to h1) in order to couple each spoke attachment seat of said plurality of spoke attachment seats to a respective spoke attachment assembly.

In both of the aforementioned aspects, the movement of the spoke attachment assembly towards and up to the respective spoke attachment seat is obtained through a relative movement of the spoke attachment assembly with respect to the rim element. Such a relative movement can be obtained by moving the spoke attachment assembly without moving the rim element, or by moving (rotating) the rim element without moving the spoke attachment assembly, or through combination of the aforementioned two movements.

In both of the aforementioned aspects, the rim element can be obtained by molding a composite material.

Alternatively, the rim element can be a profiled bar made of aluminium (or alloys thereof) or magnesium (or alloys thereof) typically obtained through an extrusion step.

In this case, the rim element can still be in the rectilinear state during the actuation of part or all of the process according to the invention, or can be already rim-shaped, still open or already closed on itself at the two ends thereof. The shaping into a circle can typically take place through a calendaring step. The joining of the ends can typically take place by welding, for example flash welding, or TIG welding, or by insertion of a sleeve and gluing, or by pin connection or other.

In the process of the invention, the at least one shaped washer is applied onto the stem of the nipple before the insertion of the spoke attachment assembly in the at least one opening of the spoke attachment chamber and remains associated with the nipple during the aforementioned insertion and until the spoke attachment assembly is constrained to the respective spoke attachment seat. This is obtained thanks to the fact that the aforementioned insertion takes place along an insertion direction and according to a sense of insertion which is oriented so that the spoke attachment assembly is arranged in an operative position in which the force of gravity acting on the at least one shaped washer tends to move it towards the enlarged head of the nipple. Such an operative position is maintained during the insertion of the spoke attachment assembly in the aforementioned at least one opening until the stem of the nipple reaches the spoke attachment surface. In this way, the assembly and/or manufacturing operations of the wheel are extremely simplified.

In a third aspect thereof, the invention relates to a spoked bicycle wheel, comprising:

a rim comprising a tyre coupling channel and at least one spoke attachment chamber provided with at least one opening and with a plurality of spoke attachment seats arranged on a spoke attachment surface, said at least one opening comprising a number of openings smaller than the number of spoke attachment seats;

a plurality of nipples each having an enlarged head arranged in said at least one spoke attachment chamber and a stem provided with a coupling portion configured to be coupled to a respective spoke inserted in a respective spoke attachment seat;

a plurality of spokes each having an end portion coupled to the coupling portion of the stem of a respective nipple;

characterized in that it comprises, for each of said nipples, at least one shaped washer associated with the nipple and interposed between the enlarged head of the nipple and the spoke attachment seat.

Such a wheel can be made easily thanks to the process of the invention described above. The provision in the at least one spoke attachment chamber of a number of openings smaller the number of spoke attachment seats makes it possible not to require the application of a band on the rim in order to assemble and/or manufacture wheels with tubeless tyres or in order to avoid damaging the air chamber of the tyre.

In at least one of the aforementioned aspects, the present invention can have the preferred features described hereinafter, both singularly or in combination, except if expressly stated otherwise.

One or more shaped washers can be associated with each nipple, for example two shaped washers. In this last case the shaped washers are arranged substantially concentric to one another, in order to allow a better alignment between the nipple and the spoke mounted therein, in particular in the case of a wheel with spokes that do not have a radial arrangement.

Hereinafter, for the sake of simplicity of language reference will often be made to a shaped washer associated with a nipple. What is stated nevertheless also applies to the case in which a plurality of shaped washers are associated with a nipple, except if expressly stated otherwise.

Preferably, the step of inserting the spoke attachment assembly in the at least one spoke attachment chamber comprises associating said spoke attachment assembly with a maneuvering means configured to move said spoke attachment assembly towards the spoke attachment surface.

Preferably, said spoke attachment assembly further comprises a portion made of a magnetically attractable material, like for example steel and/or alloys thereof.

More preferably, such a portion made of a magnetically attractable material is defined in or by the nipple, and/or in or by the at least one shaped washer, and/or in or by further elements associated with the nipple and/or with the at least one shaped washer.

In this case, preferably, said maneuvering means is of a magnetic type. More preferably, said maneuvering means comprises a maneuvering magnet configured to be handled by an operator close to the spoke attachment assembly so as to interact with the portion of the spoke attachment assembly made of a magnetically attractable material in order to insert the spoke attachment assembly in the spoke attachment chamber.

Preferably, said portion made of a magnetically attractable material is defined by an insert made of a metallic material.

Advantageously, once associated with the nipple, the insert makes the nipple attractable by the aforementioned maneuvering magnet. This is particularly useful in the manufacturing steps of the wheel, as will be described better hereinafter.

Preferably, said insert has a head and an at least partially threaded rod that is screwed into a threaded hole formed in the stem of the nipple.

Advantageously, it is possible to use particularly simple inserts, similar to conventional screws.

Preferably, the step of inserting said spoke attachment assembly in the at least one spoke attachment chamber comprises the following steps:

coupling said maneuvering magnet to said spoke attachment assembly due to a magnetic interaction between the maneuvering magnet and said portion made of a magnetically attractable material;

inserting the maneuvering magnet in said at least one spoke attachment chamber through said at least one opening;

extracting the maneuvering magnet from said at least one spoke attachment chamber through a second opening substantially aligned with said at least one opening;

decoupling the maneuvering magnet from said spoke attachment assembly.

Preferably, the step of moving said spoke attachment assembly is preceded by a step of holding the spoke attachment assembly in contact with the spoke attachment surface by decoupling the maneuvering magnet from said spoke attachment assembly and simultaneously magnetically coupling said spoke attachment assembly to a guiding magnet facing said rim element close to said second opening.

Preferably, the step of moving said spoke attachment assembly takes place due to a magnetic interaction between said portion made of a magnetically attractable material and the guiding magnet and comprises moving the guiding magnet along said rim element towards and up to one of said spoke attachment seats.

Preferably, the step of inserting the stem of the nipple in said spoke attachment seat takes place due to a magnetic coupling between said guiding magnet and said portion made of a magnetically attractable material.

Preferably, said portion made of a magnetically attractable material is defined by the aforementioned insert made of a magnetically attractable material once it is removably coupled to the nipple.

Preferably, the step of inserting the stem of the nipple in said spoke attachment seat comprises bringing said at least one shaped washer in abutment on the spoke attachment surface and the enlarged head of said nipple in abutment on said at least one shaped washer.

Preferably, the step of constraining said spoke attachment assembly to said spoke attachment seat comprises coupling the stem of the nipple to an anchoring element configured to attach the nipple to the spoke attachment seat.

The process of the present invention can be used to constrain the spoke attachment assemblies in the respective spoke attachment seats of a rim element in the form of a profile bar still to be shaped into a circle, or of a profiled bar already shaped into a circle or to manufacture the wheel of the present invention.

In the case in which the operation of constraining each spoke attachment assembly to the respective spoke attachment seat is not carried out simultaneously with the manufacturing of the wheel, i.e. before coupling each nipple to a respective spoke, after having removed the insert, if provided, from the nipple, an anchoring element is coupled to the portion of the stem of the nipple that projects from the spoke attachment surface on the opposite side with respect to the one in which the enlarged head of the nipple is arranged. The anchoring element has dimensions greater than those of the spoke attachment seat. Such an anchoring element is subsequently removed in the manufacturing steps of the wheel in order to associate a respective spoke with the nipple. The aforementioned anchoring element can, for example, be an elastic ring, or a clamp, arranged around the stem of the nipple or around the rod of the aforementioned insert, if provided, or a head of the aforementioned insert, having a size greater than the spoke attachment seat.

On the other hand, in the case in which the operation of constraining each spoke attachment assembly to the respective spoke attachment seat is carried out during the manufacturing of the wheel, step g) of constraining said spoke attachment assembly to said spoke attachment seat comprises fixing an end portion of a spoke to said coupling portion of the stem of the nipple.

In preferred embodiments, the coupling portion of the stem of the nipple comprises a threaded hole which opens at a free end of the stem. In this case, the spoke comprises, at an end portion thereof, an outer threading configured to be screwed into the threaded hole of the stem of the nipple to allow the adjustment of the tension of the spoke by rotating the nipple.

Preferably, in the case in which the spoke attachment assembly comprises two shaped washers, in the wheel of the invention a first shaped washer is interposed between the enlarged head of the nipple and the spoke attachment seat and a second shaped washer is interposed between the enlarged head of the nipple and the first shaped washer.

Preferably, said at least one opening comprises a single opening.

Preferably, said single opening is a through hole configured to house an inflation valve of a tyre.

Preferably, in the spoked wheel according to the present invention the rim is made of aluminium or an alloy thereof, or, more preferably, of a composite material.

Preferably, in the rim of the wheel of the present invention the spoke attachment chamber is defined between an upper bridge of the rim, which separates the tyre coupling channel from the spoke attachment chamber, and a lower bridge of the rim, which comprises the spoke attachment surface.

BRIEF DESCRIPTION OF THE DRAWINGS

Further features and advantages of the invention will become clearer from the description of preferred embodiments thereof, made with reference to the attached drawings, where.

DETAILED DESCRIPTION OF THE PREFERRED EMBODIMENTS

Throughout the present description and in the following claims the following definitions apply.

The terms "axial", "axially" and similar terms are used to refer to a direction substantially coinciding with or substantially parallel to the rotation axis of the wheel.

The terms "radial", "radially" and similar terms are used to refer to a direction perpendicular to the rotation axis of the wheel and incident on the rotation axis of the wheel.

The terms "circumferential", "circumferentially" and similar terms are used to refer to a direction oriented along a line that extends around the rotation axis of the wheel.

The terms "axially inner" and "axially outer" and similar terms are used to refer to positions respectively closer to, and farther from, a transversal mid-plane of the wheel, whereas the terms "radially inner" and "radially outer" and similar terms are used to refer to positions respectively closer to, and farther from, the rotation axis of the wheel.

The term "longitudinal", on the other hand, is used to refer to a main direction of extension of the bicycle component considered.

The term "composite material" is used to indicate a material comprising structural fibers incorporated in a polymeric material. The structural fibers are preferably selected from the group comprising carbon fibers, glass fibers, boron fibers, aramid fibers, ceramic fibers and combinations thereof. The polymeric material can be thermoplastic or thermosetting.

The term "horizontal plane" is used to indicate a plane perpendicular to the vector of the force of gravity.

The terms "low", "high", "under" and "over" are used to refer to relative positions with respect to a horizontal reference plane. Thus, for example, with reference to the ground, a "low" position is a position closer to the ground with respect to a "high" position and a position "below" any element is a position closer to the ground with respect to a position "above" that element.

The term "insertion direction" is used to indicate the straight line along which the spoke attachment assembly is moved during the insertion thereof in the spoke attachment chamber.

The term "inclined direction" with respect to a plane is used to indicate a direction not parallel to the plane.

The term "sense of insertion" is used to indicate the sense along which the spoke attachment assembly is moved along the aforementioned insertion direction during the insertion thereof in the spoke attachment chamber.

Figure 1:
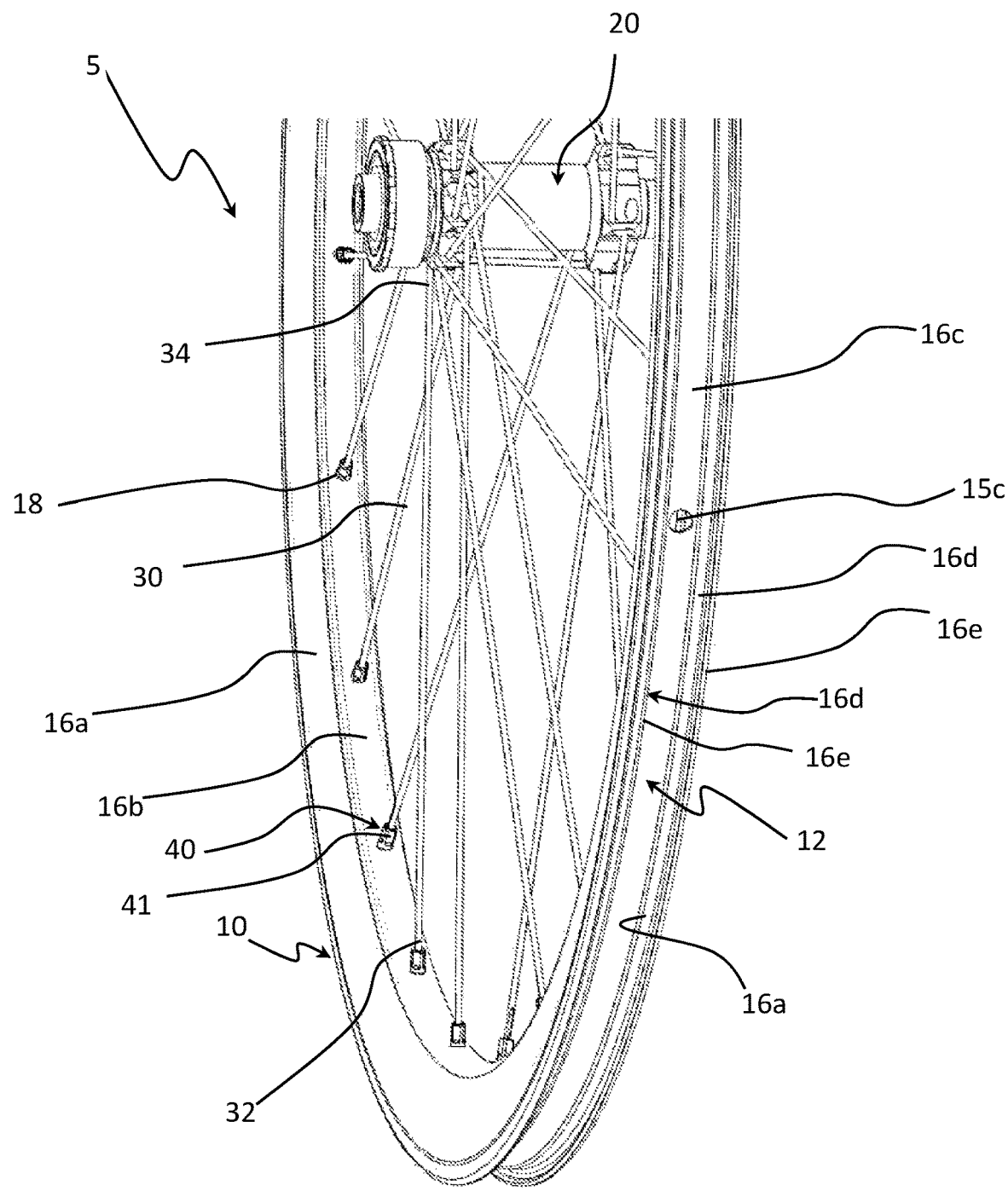
FIG. 1 is a schematic perspective view of a portion of a spoked bicycle wheel according to the present invention.

With reference now to FIG. 1, reference numeral 5 refers, as a whole, to a first embodiment of a spoked bicycle wheel according to the present invention.

The wheel 5 comprises a rim 10, a hub 20 and a plurality of spokes 30 extending between the hub 20 and the rim 10. For the sake of clarity of illustration, reference numeral 30 is associated with only one of the spokes shown.

The rim 10 can be made of aluminium or an alloy thereof, through extrusion of a profiled bar.

Preferably, the rim 10 is, at least in part, made of a composite material. More preferably, the rim 10 is entirely made of a composite material.

The rim 10 is configured to be used with a tubeless tyre (not shown).

The rim 10 is formed by two opposite side walls 16a connected to a radially inner end by a radially inner circumferential wall or lower bridge 16b. The two side walls 16a are also connected at an intermediate point thereof by a radially outer circumferential wall or upper bridge 16c, so as to have a substantially inverted "A"-shaped cross section.

Preferably, the lower bridge 16b and the upper bridge 16c have a substantially cylindrical shape.

The side walls 16a comprise respective radially outer portions or wings 16d that form, with the upper bridge 16c, a tyre coupling channel 12. The wings 16d are provided with respective folded ends 16e that are used to hold the beads of the tyre coupled to the rim 10.

The wings 16d are subject to geometric and dimensional constraints both for the need to attach the tyre, and for the need to provide, externally, a suitable sliding surface for the possible brake pads. The upper bridge 16c is subject to the constraint, in the case of a tubeless tyre, of making an airtight seal with the tyre. In the example shown, the upper bridge 16c has a single opening 15c for the passage and the housing of an inflation valve (not shown) of the tyre or of the air chamber of the tyre.

As shown in FIGS. 6-9, the rim 10 comprises, in a radially inner position with respect to the tyre coupling channel 12, a spoke attachment chamber 14. In particular, the spoke attachment chamber 14 is delimited by the radially inner portions 16f of the side walls 16a, by the lower bridge 16b and by the upper bridge 16c.

The radially inner portions 16f of the side walls 16a and the lower bridge 16b are not subject to particular geometric or dimensional constraints and can therefore be replaced by a single wall having an arc of circle shaped cross section or by a plurality of walls so as to form a section having a shape which is more complex than the one shown, possibly defining a plurality of annular spoke attachment chambers (not shown).

The particular shape of the rim 10 shown in FIG. 1 and in FIGS. 6-9 therefore has the purpose of merely illustrating and non-limiting the present invention.

As shown in FIGS. 6-9, the lower bridge 16b comprises a spoke attachment surface 17 on which an opening 15b is formed. The opening 15b is substantially aligned in the radial direction with the opening 15c made on the upper bridge 16c and also provided for the passage and the housing of the inflation valve of the tyre or of the air chamber of the tyre.

In an embodiment of the rim 10, the aforementioned openings 15b, 15c are defined by respective through holes having a diameter comprised between about 6 mm and about 9 mm, for example equal to 7 mm.

As shown in FIG. 1, the spoke attachment surface 17 comprises a plurality of spoke attachment seats 18, each defined by a respective through hole. For the sake of clarity of illustration, reference numeral 18 is associated with only one of the shown spoke attachment seats.

In embodiments different from the one shown, the spoke attachment seats 18 are formed in one or both of the radially inner portions 16f of the side walls 16a of the rim 10.

The spoke attachment seats 18 are equally spaced and uniformly distributed along the middle plane of the rim 10. The number and the distribution of such spoke attachment seats 18 can however differ greatly from those of the embodiment illustrated herein. For example, the spoke attachment seats 18 could be grouped in groups of two, three or four and/or be made on plural planes, different from the middle plane of the rim 10.

Preferably, each spoke attachment seat 18 has a substantially circular section and is defined by a through hole having a diameter smaller than that of the through holes defining the openings 15b and 15c. The diameter of the through holes defining the spoke attachment seats 18 is preferably comprised between about 2.5 mm and about 7 mm, for example equal to about 5 mm.

To insert the spoke attachment assembly 80 in the spoke attachment chamber 14 it may also be contemplated not to use opening 15c, and make a dedicated opening (not shown) on the upper bridge 16c. In this way it is possible to replace a broken or damaged spoke attachment assembly 80 without having to dismount and remount the inflation valve of the tyre. Such a dedicated opening is preferably provided with a removable cover configured to close such an opening when not used.

In the rim 10 of FIG. 1, the spokes 30 are coupled to the rim 10, each at a respective spoke attachment seat 18 through a respective nipple 40. For the sake of clarity of illustration, reference numeral 40 is associated with only one of the nipples shown.

Figure 2:
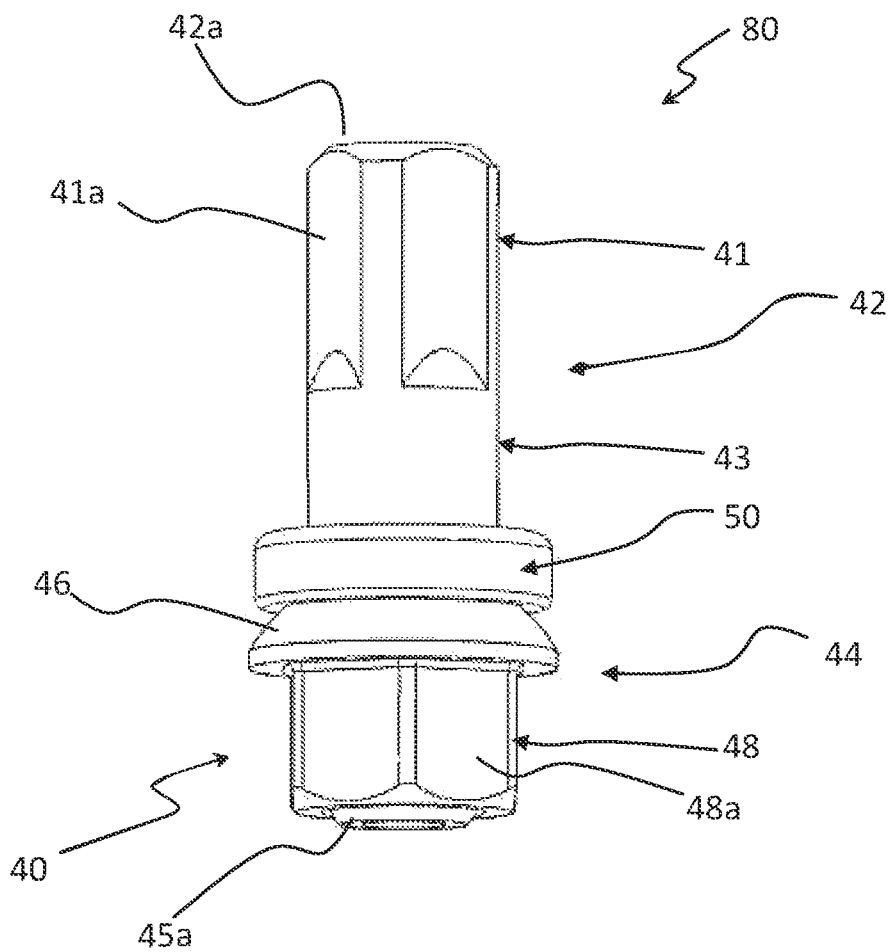
FIG. 2 is a longitudinal section of a first preferred embodiment of a spoke attachment assembly according to the present invention.

As shown in FIG. 2, the nipple 40 comprises a stem 42 configured to extend through the spoke attachment seat 18 and an enlarged head 44 (i.e. having an outer dimension greater than that of the stem 42) configured to remain inside the spoke attachment chamber 14.

A first end portion 32 of a spoke 30 is attached to the nipple 40. The second end portion 34 of the spoke 30, on the other hand, is attached to the hub 20 (FIG. 1).

The nipple 40 is preferably made of aluminium (or an alloy thereof), brass or steel.

In the embodiments illustrated herein, each nipple 40 allows the adjustment of the tension of the spoke 30 associated therewith.

Figure 4:
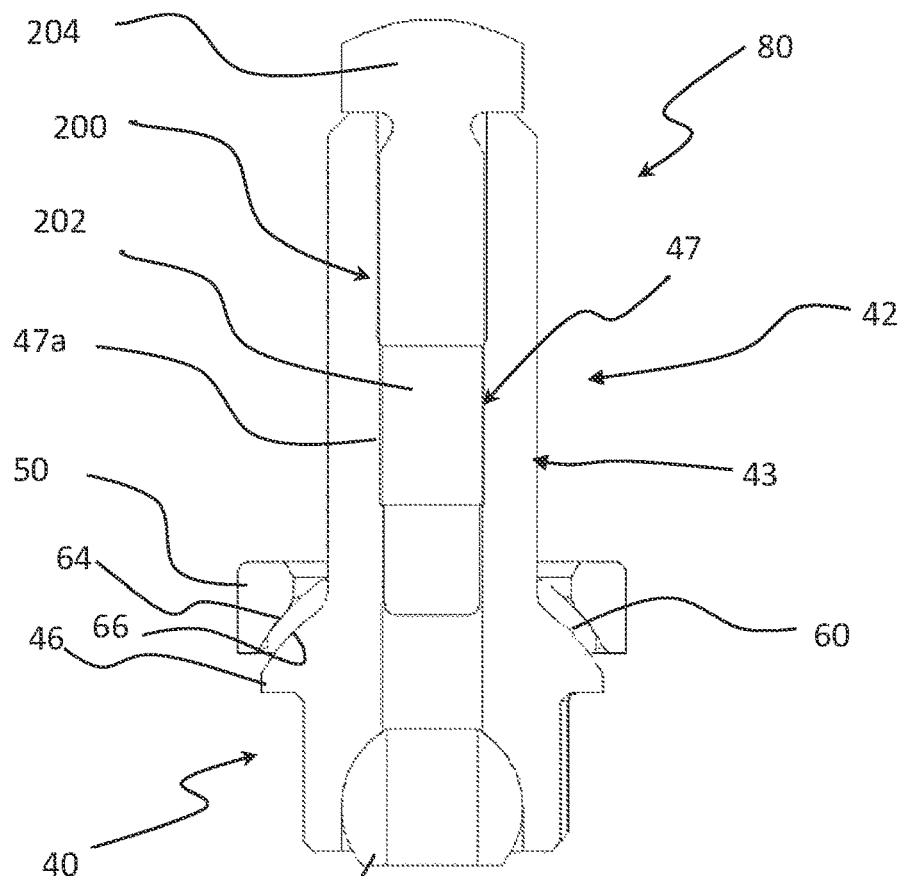
FIG. 4 is a longitudinal section of a second preferred embodiment of a spoke attachment assembly according to the present invention.

As shown in FIG. 4, the stem 42 of the nipple 40 comprises for this purpose a coupling portion 47 configured to be coupled to the spoke 30. Such a coupling portion 47 comprises a threaded hole 47a which opens at a free end 42a of the stem 42 (FIG. 2). The threaded hole has a length such as to allow the screwing to different depths of the first end portion 32 of the spoke 30. The latter has an outer threading that is threaded in a matching manner with the threaded hole 47a, so as to achieve the adjustment of the tension of the spoke 30 by rotating the nipple 40.

In the non-limiting example illustrated herein, the threaded hole 47a is a through hole and extends along the entire nipple 40, i.e. both at the stem 42 and at the enlarged head 44.

The stem 42 of the nipple 40 is configured to be inserted in the respective spoke attachment seat 18 so that a radially inner end portion 41 projects from the lower bridge 16b in the radial direction inside the rim 10, as shown in FIG. 1 in which, for the sake of simplicity of illustration, reference numerals 40 and 41 are associated with only one of the nipples shown.

As shown in FIG. 2, a shaped washer 50 is applied onto the stem 42 of each nipple 40.

Upon tensioning the spoke 30, the shaped washer 50 goes in abutment on the spoke attachment surface 17 of the lower bridge 16b of the rim 10 concentrically to the spoke attachment seat 18, inside the spoke attachment chamber 14 and in a radially outer position with respect to the lower bridge 16b, acting as a support for the enlarged head 44 of the nipple 40.

The shaped washer 50 has an outer size greater than the size of the spoke attachment seat 18 and allows a better distribution of the stresses on the lower bridge 16b of the rim 10 around the spoke attachment seat 18 upon tensioning the spoke 30.

Figure 3:
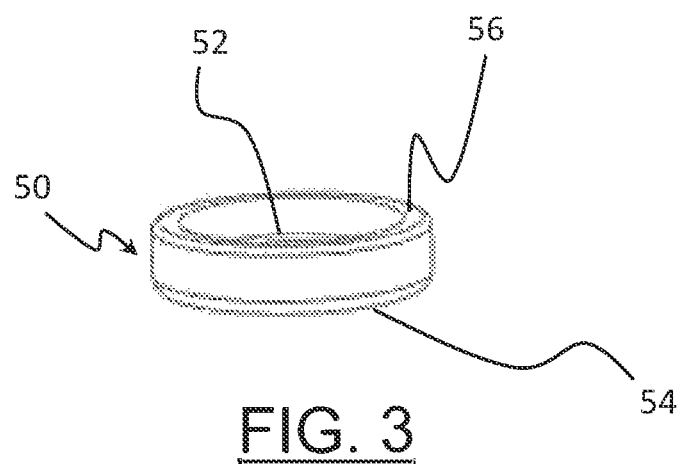
FIG. 3 is a schematic perspective view of a shaped washer forming part of the spoke attachment assembly of FIG. 2.

As shown in FIGS. 2 and 3, the shaped washer 50 has an annular shape, with a central through hole 52, a substantially flat radially inner surface 54 that is configured to abut on the spoke attachment surface 17 of the lower bridge 16b of the rim 10 and a radially outer surface 56 configured to abut with the enlarged head 44 of the nipple 40.

In the non-limiting example shown in FIGS. 2 and 3, the radially outer surface 56 has a substantially frusto-conical or spherical shape. Correspondingly, the enlarged head 44 of the nipple 40 has a support portion 46 with a substantially frusto-conical or spherical shape.

It is possible to foresee systems aimed to avoid the unscrewing of the nipple 40 from the spoke 30 (for example due to vibrations). For example, it is possible to use glues between the threads of the end portion 32 of the spoke 30 and the threaded hole 47a of the nipple 40. Or, at the head of the threaded end portion 32 of the spoke 30, and in particular in a radially outer position with respect to the threaded hole 47a, it is possible to arrange a perforated ball (not shown), for example made of nylon, arranged in a suitable seat 45a formed in the enlarged head 44 (as shown in FIG. 2).

In the variant of FIG. 4, the stem 42 of the nipple 40 has a further shaped washer 60 applied thereon. The further shaped washer 60 is interposed between the enlarged head 44 of the nipple 40 and the shaped washer 50.

The further shaped washer 60 has an annular shape and has a central through hole 62 configured to be arranged coaxially to the central through hole 52 of the shaped washer 50. In this way, the shaped washer 50 is at least partially arranged around the further shaped washer 60.

As shown in FIG. 4, the further shaped washer 60 has a substantially frusto-conical or spherical shape, with a radially inner frusto-conical or spherical surface 64 which is configured to abut with the radially outer surface 56 of the shaped washer 50, and a radially outer frusto-conical or spherical surface 66 which is configured to abut with the support portion 46 of the enlarged head 44 of the nipple 40.

Preferably, the shaped washer 50 and the further shaped washer 60 are made of a metallic material, for example steel.

As shown in FIG. 2, the enlarged head 44 of the nipple 40 comprises, in a radially outer position with respect to the support portion 46, a grip portion 48 having, in particular, flattened side faces 48a.

The stem 42 of the nipple 40 comprises, in a radially outer position with respect to the end portion 41, a substantially cylindrical portion 43 where the shaped washer 50 is applied, whereas the end portion 41 has longitudinal gripping splines 41a configured to be engaged by a suitable tool (not shown) in order to rotate the nipple 40 during the tensioning of the spoke 30.

As shown in FIG. 4, an insert 200 is removably associated with the nipple 40.

The insert 200 is made of a metallic material, preferably steel.

The insert 200 comprises a head 204 and a rod 202.

The rod 202 comprises an outer threading, matching the inner threading of the threaded hole 47a of the stem 42 of the nipple 40, in order to screw the rod 202 of the insert 200 into the stem 42 of the nipple 40.

The head 204 has a substantially cylindrical shape, with diameter preferably smaller than the transversal dimension of the stem 42 of the nipple 40 and smaller than the diameter of the substantially cylindrical portion 43 of the stem 42.

Hereinafter, only for the sake of simplicity of description reference will be made to a spoke attachment assembly 80 that comprises only the shaped washer 50, but what has been stated has analogous application also to the cases in which the spoke attachment assembly 80 also comprises the shaped washer 60.

Figure 5:
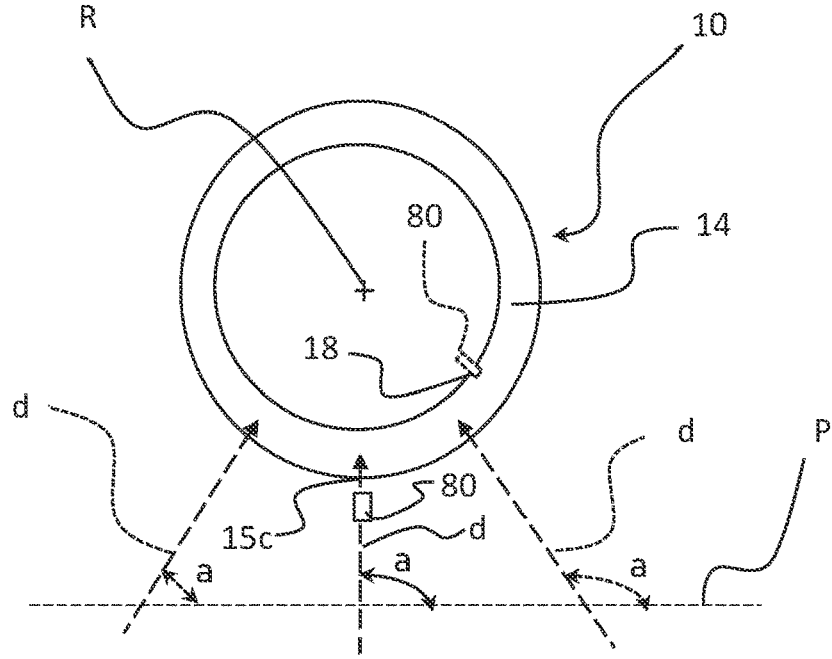
FIG. 5 is a schematic view representative of a step of a process aimed at manufacturing the wheel of FIG. 1; and, FIGS. 6-9 are perspective and partially sectioned views of successive steps of the aforementioned process.

As schematically shown in FIG. 5, the manufacture of the wheel 5 comprises the coupling of the spokes 30 to the rim 10 after having inserted a number of spoke attachment assemblies 80 equal to the number of spoke attachment seats 18 in the spoke attachment chamber 14 of the rim 10 and after having constrained a respective spoke attachment assembly 80 to each of the spoke attachment seats 18. In FIG. 5, a spoke attachment assembly 80 in the insertion step into the spoke attachment chamber 14 through the opening 15c is shown with a solid line and the same spoke attachment assembly 80 constrained in a spoke attachment seat 18 is shown with a dashed line.

The insertion of the spoke attachment assembly 80 in the rim 10 preferably takes place by arranging the rim 10 vertically, i.e. with the rotation axis R thereof oriented horizontally, and with the opening 15c facing downwards. In this way, in order to insert the spoke attachment assembly 80 in the spoke attachment chamber 14 of the rim 10 the spoke attachment assembly 80 must be arranged in an operative position such that the shaped washer 50 (and possibly also the shaped washer 60) tends to remain applied onto the stem 42 of the nipple 40 due to the force of gravity. Such an operative position is any position in which at least part of the enlarged head 44 of the nipple 40 is lower with respect to the free end portion of the stem 42 of the nipple 40 and the stem 42 of the spoke attachment assembly 40 extends along a longitudinal direction inclined with respect to a horizontal direction. In such an operative position, the shaped washer 50 tends to be pushed towards the enlarged head 44 of the nipple 40 and, possibly, to go into abutment on the latter.

The aforementioned operative position is maintained during the insertion of the spoke attachment assembly 80 in the spoke attachment chamber 14 and until the stem 42 of the nipple 40 of the spoke attachment assembly 80 is brought at the spoke attachment surface 17 of the lower bridge 16b of the rim 10.

In the example schematized in FIG. 5, the opening 15c is arranged so that the insertion of the spoke attachment assembly 80 in the spoke attachment chamber 14 takes place along a vertical insertion direction d, i.e. inclined by an angle α equal to 90° with respect to a horizontal plane P arranged below the rim 10. In FIG. 5 other two possible insertion directions d are also shown with a broken line, each of them inclined by a predetermined angle α different from 90° with respect to the aforementioned horizontal plane P. The angle α is preferably comprised in a range between 0° and 180°, excluding the extreme values. Therefore, preferably, the insertion direction d is not horizontal.

The insertion of the spoke attachment assembly 80 in the spoke attachment chamber 14 of the rim 10 takes place moving along the insertion direction d according to a sense of insertion oriented from the bottom towards the top (in accordance with what has been described the orientation from the bottom towards the top is not necessarily along a vertical direction) by inserting into the opening 15c firstly the stem 42 and then the enlarged head 44 of the nipple 40. Such an insertion direction is thus oriented progressively moving away from the plane P as the spoke attachment assembly 80 is moved along the insertion direction d during the insertion of the spoke attachment assembly 80 in the spoke attachment chamber 14.

FIGS. 6-9 show the steps with which the nipple 40 and the relative shaped washer 50 are inserted in the rim 10 and positioned in a spoke attachment seat 18.

Figure 6:
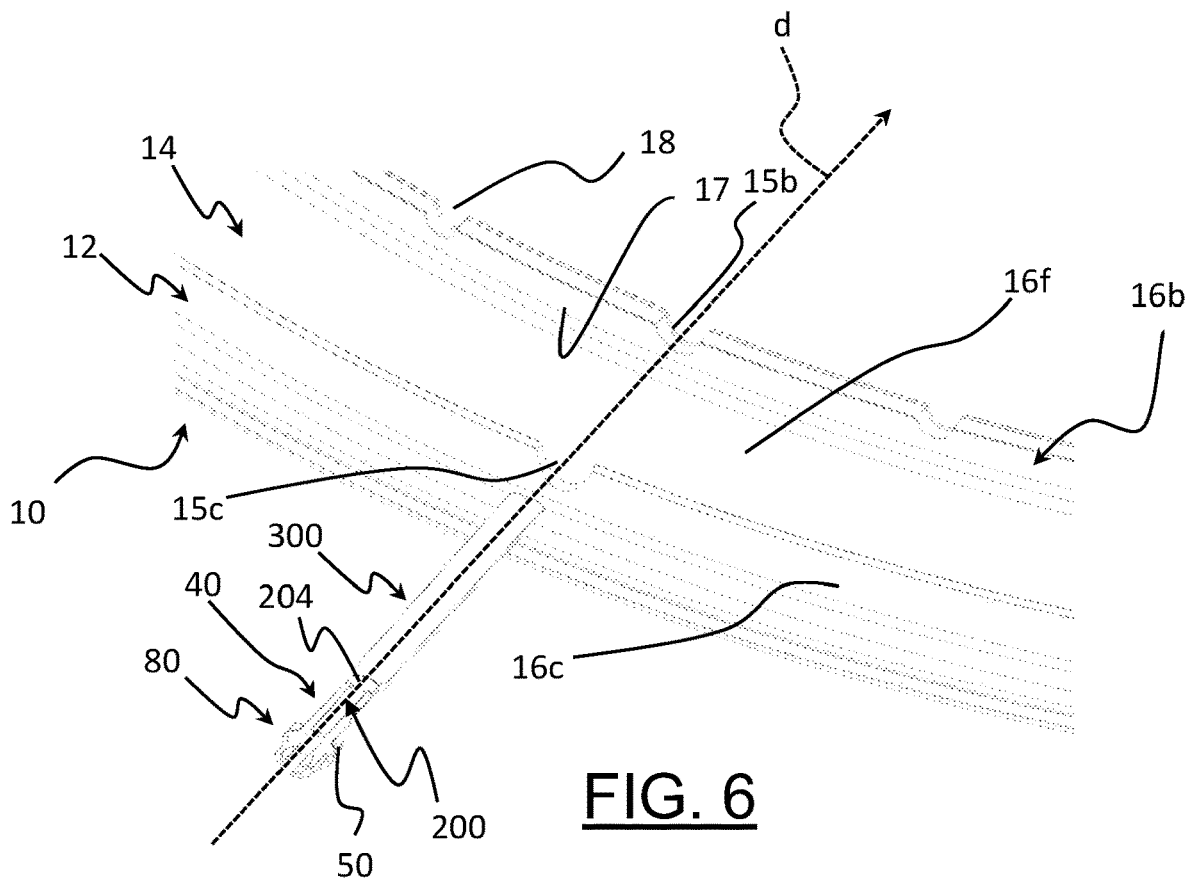

FIG. 6 shows the insertion step of the spoke attachment assembly 80 in the opening 15c of the upper bridge 16c of the rim 10 of the wheel 5 along the insertion direction d and according to the sense of insertion discussed above.

In particular, the spoke attachment assembly 80 shown is the one of the embodiment described with reference to FIG. 2, but it could also be the one of FIG. 4.

The spoke attachment assembly 80 comprises, in addition to the nipple 40 and the shaped washer 50 held on the nipple 40 due to the force of gravity, the insert 200 described with reference to FIG. 4. The insert 200 is screwed into the stem 42 of the nipple 40.

A maneuvering magnet 300 is magnetically attached to the head 204 of the insert 200. In the illustrated example, the maneuvering magnet 300 has a substantially elongated shape, for example cylindrical, and is arranged so that an end portion 302 thereof magnetically locks to the head 204 of the insert 200. In particular, the maneuvering magnet 300 is arranged substantially aligned with the stem 42 of the nipple 40 (thus substantially aligned with the insertion direction d) and in contact with the head 204 of the insert 200.

The outer size of the maneuvering magnet 300 can be substantially equal to that of the stem 42 of the nipple 40 or different from the latter.

The maneuvering magnet 300 is inserted firstly in the opening 15c provided in the upper bridge 16c of the rim 10 and, after a movement thereof along the insertion direction d, in the opening 15b provided in the lower bridge 16b of the rim 10, thereby pulling the spoke attachment assembly 80 inside the spoke attachment chamber 14 of the rim 10.

Figure 7:
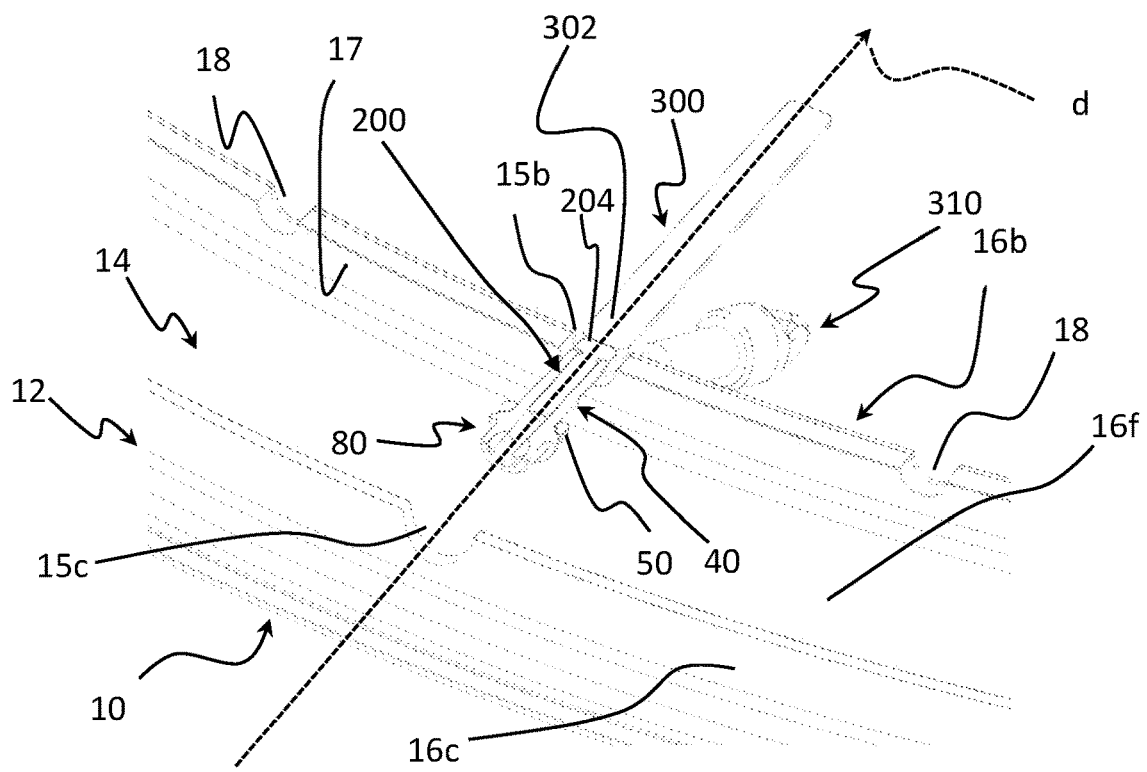

FIG. 7 shows the extraction step of the maneuvering magnet 300 from the opening 15b of the lower bridge 16b of the rim 10 along the insertion direction d.

Thereafter, the maneuvering magnet 300 is decoupled from the head 204 of the insert 200.

At the same time, a guiding magnet 310 is brought close to the opening 15b. The guiding magnet 310 enters into a magnetic interaction with the insert 200, in particular with the head 204 of the insert 200.

Figure 8:
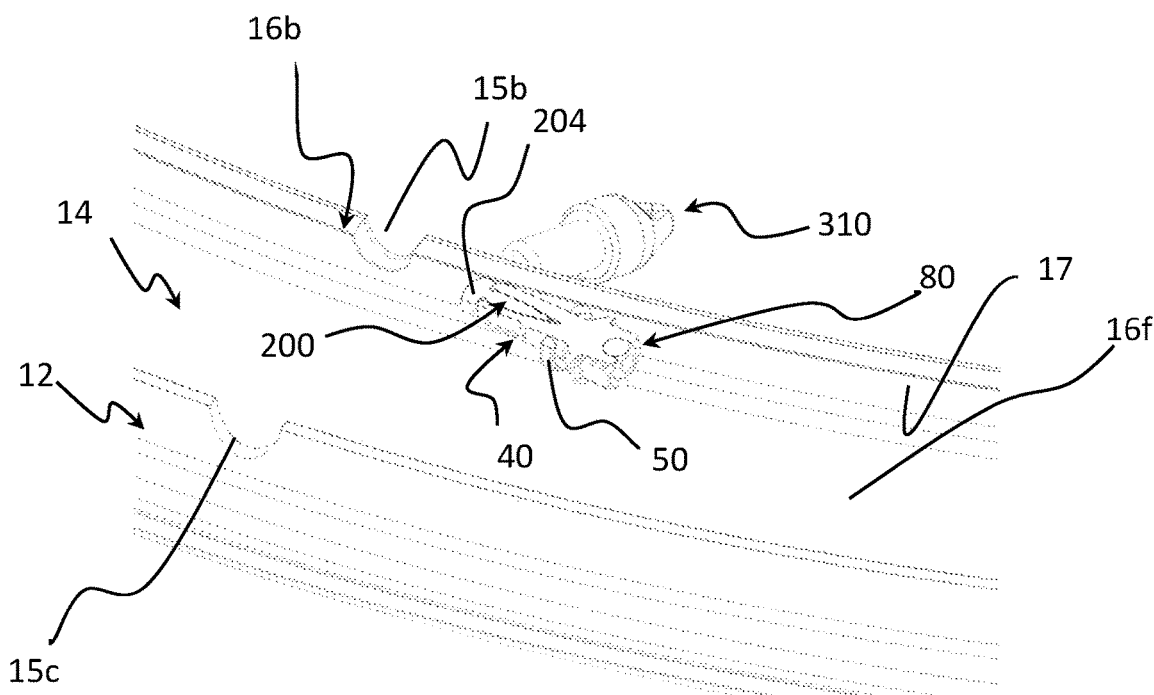

As shown in FIG. 8, the guiding magnet 310 is moved along and outside of the spoke attachment surface 17 of the lower bridge 16b of the rim 10, thereby pulling the spoke attachment assembly 80 by magnetic attraction along the spoke attachment chamber 14 of the rim 10, until the spoke attachment seat 18 in which it is wished to arrange the nipple 40 and the shaped washer 50 is reached.

Figure 9:
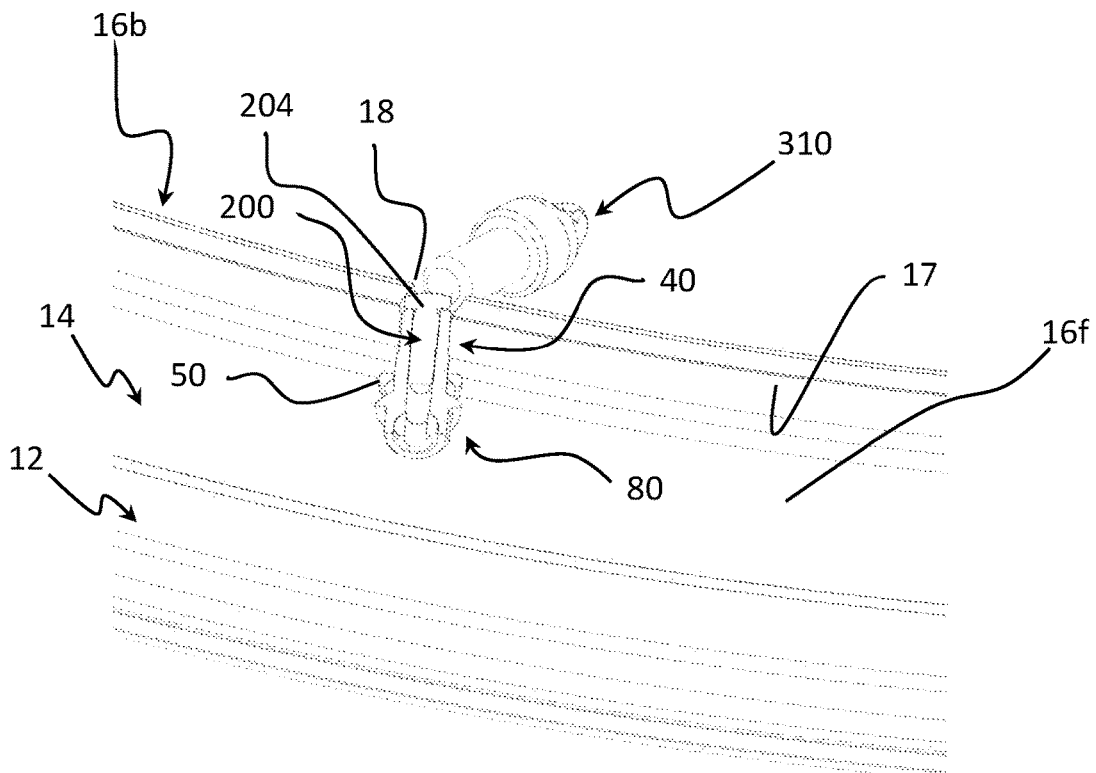

At this point, as shown in FIG. 9, the guiding magnet 310 magnetically locks to the head 204 of the insert 200. In particular, the guiding magnet 310 contacts the head 204 of the insert 200 and remains in contact therewith due to the magnetic interaction between the guiding magnet 310 and the insert 200.

Thereafter, the guiding magnet 310 is moved in the radial direction towards the inside of the rim 10 so as to insert the stem 42 of the nipple 40 in the spoke attachment seat 18 until the shaped washer 50 is brought in abutment on the spoke attachment surface 17 of the lower bridge 16b of the rim 10.

The guiding magnet 310 can thus be decoupled from the head 204 of the insert 200 and the latter can be removed from the nipple 40 to proceed with the mounting and tensioning of the spoke 30 on the nipple 40, during the manufacture of the wheel 5, or with the mounting of an anchoring element configured to hold the nipple 40 in position in the respective spoke attachment seat 18 until the moment in which, during the manufacture of the wheel 5, such an anchoring element is removed to proceed with the mounting of the spoke 30 on the nipple 40.

The mounting of the spoke 30 on the nipple 40 requires temporarily holding the nipple 40 with the fingers or a gripper tool.

Although, as already stated, the insertion direction d of the spoke attachment assembly 80 in the spoke attachment chamber 14 of the rim 10 is, preferably, not horizontal, it is nevertheless also possible to insert it along a horizontal insertion direction d, in which case the stem 42 of the nipple 40 extends along a horizontal direction. In this case, the force of gravity tends to push the shaped washer 50 on the stem 42 of the nipple 40 and thus, also in this case, the shaped washer 50 tends to remain applied onto the stem 42 of the nipple 40.

Of course, those skilled in the art can bring numerous modifications and variants to the present invention as described above, in order to satisfy specific and contingent requirements, all of which are in any case within the scope of protection defined by the following claims.

In particular, it is possible to provide for any combination of the features described with reference to the different variants of the spoke attachment assembly 80 described above.

The wheel 5 of the invention can receive both tyres provided with air chamber and tubeless tyres.

The upper bridge 16c of the rim may or may not comprise further openings, as well as the opening 15c. In any case, the number of openings made on the upper bridge 16c is smaller than the number of spoke attachment seats 18 made on the spoke attachment surface 17 of the lower bridge 16b.

The maneuvering magnet 300 can have an outer dimension greater than, smaller than or equal to the inner diameter of the shaped washer 50.

The head 204 of the insert 200 can have an outer dimension greater than, smaller than or equal to the inner diameter of the shaped washer 50.

The function of the aforementioned guiding magnet 310 can also be carried out by the maneuvering magnet 300 itself, so that in this variant in the manufacturing process of the wheel 5 only the maneuvering magnet 300 is used.

In order to move the spoke attachment assembly 80 along the spoke attachment chamber 14 of the rim 10 until the predetermined spoke attachment seat 18 is reached, instead of the guiding magnet 310 it is possible to use a semi-rigid cable, i.e. a cable that is sufficiently flexible to follow the shape of the spoke attachment chamber 14, yet rigid enough to be pushed along the spoke attachment chamber 14, as for example described in US 2007/0158996 A1.

What is claimed is:

1. A process for manufacturing a spoked bicycle wheel, comprising the steps of:
   a) providing a rim element having a tyre coupling channel and at least one spoke attachment chamber provided with at least one opening and with a spoke attachment surface comprising a plurality of spoke attachment seats;
   b) providing a spoke attachment assembly comprising:
   a nipple having an enlarged head and a stem provided with a coupling portion configured to be coupled to a respective spoke;
   at least one shaped washer applied onto the stem of the nipple, the at least one shaped washer comprising a substantially flat radially inner surface and a radially outer surface; and
   a portion made of a magnetically attractable material;
   c) inserting the spoke attachment assembly into the at least one spoke attachment chamber through said at least one opening along an insertion direction (d) that is inclined with respect to a horizontal plane (P) arranged below the rim element and according to a sense of insertion that is oriented away from the horizontal plane (P);
   d) moving the spoke attachment assembly along the insertion direction (d) until the stem of the nipple is brought at the spoke attachment surface;
   e) moving said spoke attachment assembly along the spoke attachment surface towards and up to one of said spoke attachment seats;
   f) inserting the stem of the nipple of said spoke attachment assembly in said spoke attachment seat, wherein step f) of inserting the stem of the nipple in said spoke attachment seat comprises bringing the substantially flat radially inner surface of the at least one shaped washer in abutment with the spoke attachment surface and the radially outer surface of the at least one shaped washer in abutment with the enlarged head of said nipple;
   g) constraining said spoke attachment assembly to said spoke attachment seat;
   h) repeating steps c) to g) to couple a respective spoke attachment assembly to each of the plurality of spoke attachment seats;
   wherein step c) of inserting the spoke attachment assembly in the at least one spoke attachment chamber comprises associating said spoke attachment assembly with a maneuvering means comprising a maneuvering magnet and configured to move said spoke attachment assembly towards the spoke attachment surface;
   wherein step c) of inserting said spoke attachment assembly in the at least one spoke attachment chamber further comprises the following steps:
   c1) coupling said maneuvering magnet to said spoke attachment assembly due to a magnetic interaction between the maneuvering magnet and said portion made of a magnetically attractable material;
   c2) inserting the maneuvering magnet in said at least one spoke attachment chamber through said at least one opening;
   c3) extracting the maneuvering magnet from said at least one spoke attachment chamber through a second opening substantially aligned with said at least one opening;
   c4) decoupling the maneuvering magnet from said spoke attachment assembly.

2. The process according to claim 1, wherein said portion made of a magnetically attractable material is defined by an insert made of a metallic material and having a head and an at least partially threaded rod that is screwed into a threaded hole formed in the stem of the nipple.

3. The process according to claim 1, wherein step e) of moving said spoke attachment assembly is preceded by a step of holding the spoke attachment assembly in contact with the spoke attachment surface by decoupling the maneuvering magnet from said spoke attachment assembly and simultaneously magnetically coupling said spoke attachment assembly to a guiding magnet facing said rim element close to said second opening.

4. The process according to claim 3, wherein step e) of moving said spoke attachment assembly takes place due to a magnetic interaction between said portion made of a magnetically attractable material and the guiding magnet and comprises moving the guiding magnet along said rim element towards and up to one of said spoke attachment seats.

5. The process according to claim 4, wherein step f) of inserting the stem of the nipple in said spoke attachment seat takes place due to a magnetic coupling between said guiding magnet and said portion made of a magnetically attractable material.

6. The process according to claim 1, wherein step g) of constraining said spoke attachment assembly to said spoke attachment seat comprises coupling the stem of the nipple to an anchoring element configured to attach the nipple to the spoke attachment seat.

7. The process according to claim 1, wherein step g) of constraining said spoke attachment assembly to said spoke attachment seat comprises fixing an end portion of a spoke to said coupling portion of the stem of the nipple.

* * * * *